(No Model.)
A. G. WATERHOUSE.
ELECTRIC METER.
No. 561,183. Patented June 2, 1896.
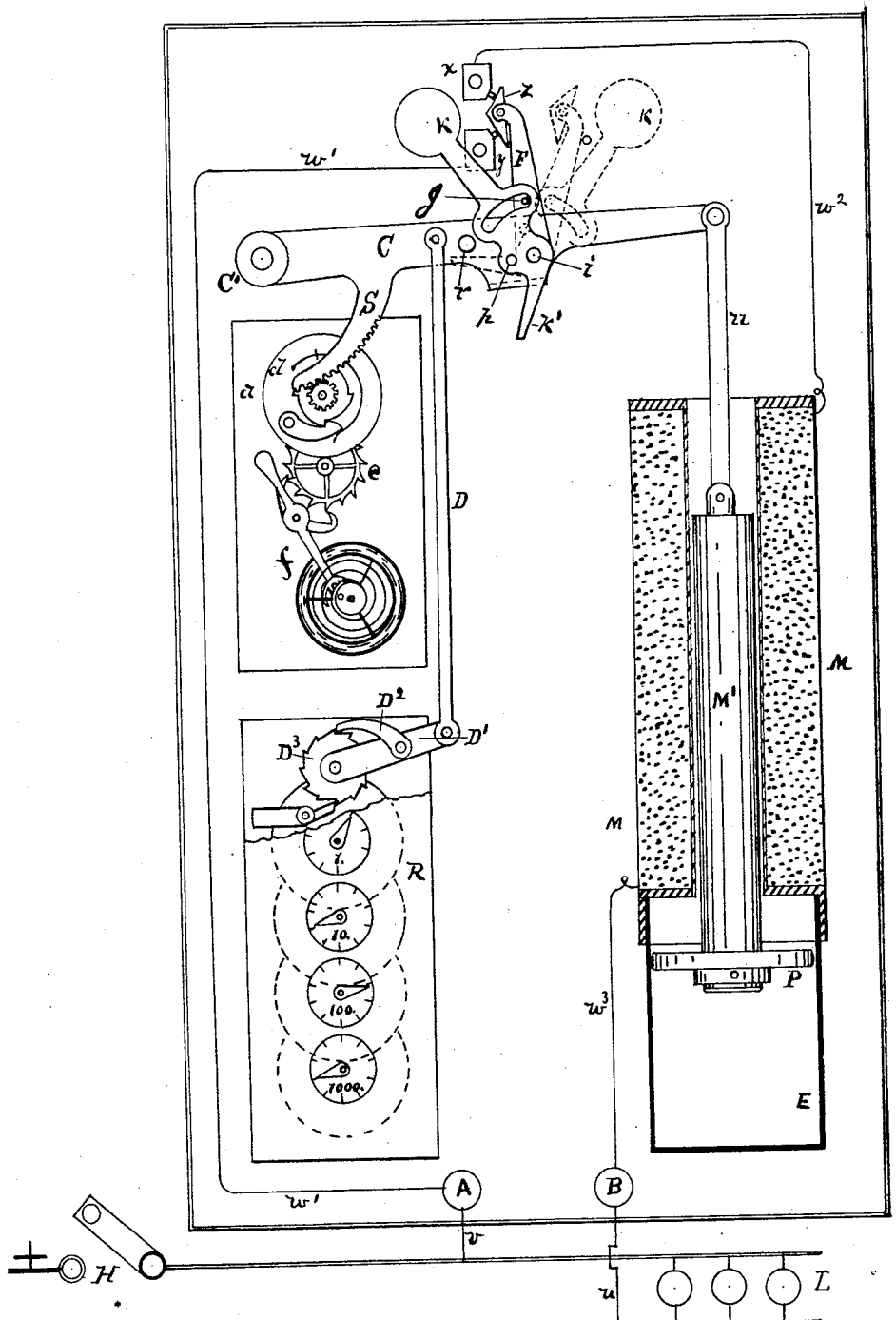
Witnesses
Inventor
Addison G. Waterhouse

UNITED STATES PATENT OFFICE.

ADDISON G. WATERHOUSE, OF HARTFORD, CONNECTICUT.

ELECTRIC METER.

SPECIFICATION forming part of Letters Patent No. 561,183, dated June 2, 1896.

Application filed May 27, 1895. Serial No. 550,758. (No model.)

*To all whom it may concern:*

Be it known that I, ADDISON GOODYEAR WATERHOUSE, a citizen of the United States, residing in the city of Hartford, in the State of Connecticut, have invented new and useful Improvements in Electric Meters, of which the following is a specification.

This invention relates to electric meters for registering the time that an electric current is used, irrespective of the volume of current, and is applicable upon constant-current circuits or upon constant-potential circuits where a known volume of current is used; and the object of the meter is to register the amount of time a current is used when the volume of current used is approximately known. The usefulness of this form of meter is obvious, as in case of arc-lamps which require a current of a certain volume or in case, as stated, of motors or other applications of electrical energy where the average volume of current can be ascertained it is unnecessary to measure the varying changes of current strength; but all that is required in such cases is to register the time that such current is used and multiply such time by the known volume of current. A meter constructed upon this plan is much more simple, cheaper, and more durable than one adapted for measuring both the volume of current and time it is used.

The nature of my invention consists of a time mechanism connected to a working circuit and adapted to run while a current is passing through such circuit and stop when the current stops. This meter is to be provided with a registering device which will record in suitable periods the amount of time such current has been passing or used, and a means within the meter for working the time-gear and register by the current to be measured or other source of power.

One of the ways of constructing a meter representing my present invention is shown by the accompanying drawing, in which M is the winding or driving magnet, which may represent any form of winding or driving motor, it being wound with a fine wire of high resistance and forming a part of a derived circuit around the work L, starting from terminal A on wire $w'$ to contact $y$, then across to bridge $z$ to point $x$, then on wire $w^2$ to magnet M, then on wire $w^3$ to terminal B. Magnet M has a movable armature M', at the bottom of which is a plunger P, that works in the air dash-pot E to prevent a too-rapid motion of the armature. When the current is on, it draws up the armature M', which, acting through the link $n$, raises the lever C, which is pivoted at C'. When the lever C is raised full up, it strikes against the pin $p$, fixed in a tilting hammer K, which is pivoted at $i$ to the frame which holds the other parts of the meter, and shifts it over to the right, as shown in dotted lines. The hammer strikes the pin J, which is fixed in the switch F, also pivoted at $i$, and knocks F to the right, so that its bridge $z$ being withdrawn from between $x$ and $y$ the circuit is broken and the armature M' will fall by gravitation, but is arrested by the lever C, having a toothed segment S, which meshes in a pinion $a$, which is ratcheted to the wheel $d$, which meshes into the click-wheel $e$ and drives the lever-escapement and balance-wheel $f$. These parts form a time-gear which is run by the weight of the lever C and armature M' and cause their slow descent, which may be arranged for any period; but in this case I gear it so that it will run down in six minutes, or ten times in one hour. When the time-gear has run down, the lever C, swinging down, causes the pin $r$ to press against the finger K' of the tilting hammer K and causes it to drop back, as shown. This motion of K causes it to strike the pin J in the switch F and brings it back, so that its bridge $z$ will close the break between $x$ and $y$ and complete the circuit, when the armature is again drawn up and the operation is repeated as long as the current is passing to do the work. When the current is broken, the time-gear stops as soon as it runs down for want of being wound up.

Every time the gear is wound up the motion of the lever C is registered by the registering mechanism R, which consists of a train of gears with pointers and dials to show the number of strokes C has made. The register R is worked by a link D, which extends from the front side of C and works the lever D', which moves the pawl $D^2$ and drives the ratchet-wheel $D^3$ and it the train of gears forming the register R.

The electrical connections of this meter are shown leading from the main circuit-lines + and − and the wires $u$ and $v$ leading from them to the terminals A and B, forming a shunt around the work, (represented by L.) When the switch H is opened, the meter is out of circuit and its movements stop.

Other forms of this kind of meter may be made, such as winding the time-gear by means external to the meter and causing the current to be timed or simply stop and start the meter; but this would be objectionable if the duty of winding up or driving the time-gear were neglected or the means of both driving the time-gear and starting and stopping it as the current was on and off could both be embodied in the meter.

I work the driving-magnet by a shunt-circuit placed around the work or around a resistance through which the working-circuit current passes, and in case the meter is placed upon an alternating-current circuit the armature or winding-motor should be formed of laminated iron.

What I claim as my invention is—

1. A motor, an electric circuit, through which said motor is actuated or controlled, and circuit-breaking mechanism, which is applied to said circuit, and is operated from said motor, in combination with a registering device, and time mechanism, which are operated from said motor, substantially as and for the purpose specified.

2. An electromagnet, or other motor, which is actuated or controlled by an electric current, and means for limiting the movements of said motor to a predetermined rate, in combination with registering mechanism, which is connected with said motor, and is actuated therefrom, substantially as and for the purpose specified.

3. In an electric meter, the combination of a time mechanism, and a register for recording the movements of the time mechanism, with an electromagnet, or motor having a movable part, from which motion is imparted to said time mechanism and register, substantially as and for the purposes set forth.

4. An electromagnet, or other motor, which is actuated or controlled by an electric current, and means for registering the movements of said motor, in combination with time mechanism, to which motion is imparted from said motor, substantially as and for the purpose specified.

5. In an electric meter for measuring the time that an electric current is used in a conductor for work, the combination of an electromagnet, or motor having a movable part, placed in a derived circuit around such work, of a time mechanism and a register for recording the movements of the time mechanism, driven by the movable parts of said magnet or motor, substantially as set forth.

ADDISON G. WATERHOUSE.

Witnesses:
CHAS. E. WOOTON,
CLARENCE A. COVIL.